Figure 1:
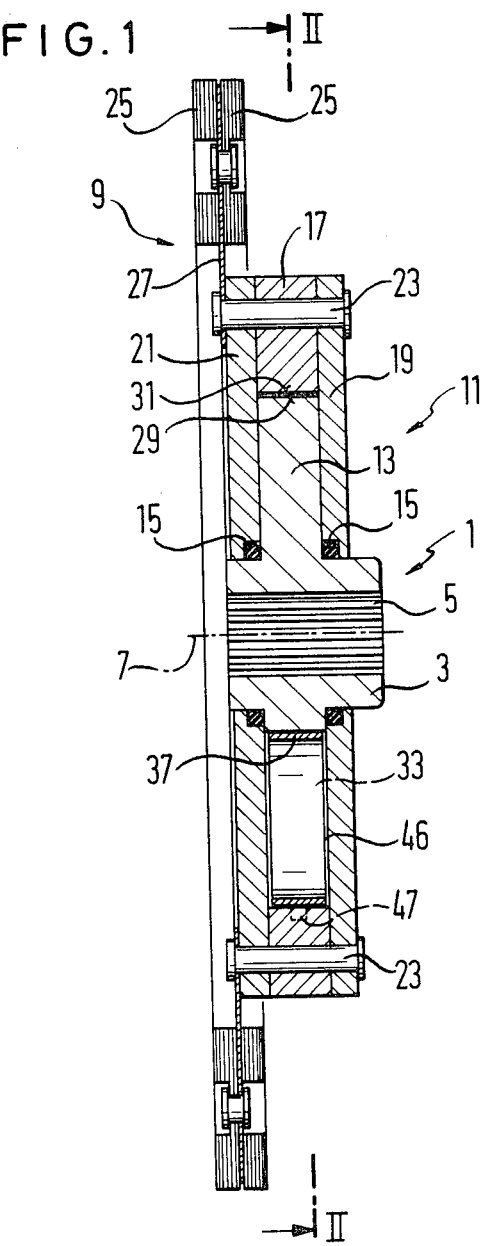

United States Patent [19]

Lutz et al.

[11] Patent Number: 4,485,906
[45] Date of Patent: Dec. 4, 1984

[54] TORSIONAL VIBRATION DAMPER, PARTICULARLY FOR THE CLUTCH DISK OF A MOTOR VEHICLE FRICTION DISK CLUTCH

[75] Inventors: Dieter Lutz, Schweinfurt; Wolfgang Thieler, Hassfurt-Uchenhofen, both of Fed. Rep. of Germany

[73] Assignee: Sachs-Systemtechnik GmbH, Schweinfurt, Fed. Rep. of Germany

[21] Appl. No.: 400,034

[22] Filed: Jul. 20, 1982

[30] Foreign Application Priority Data

Jul. 31, 1981 [DE] Fed. Rep. of Germany ....... 3130228

[51] Int. Cl.³ ............................ F16D 3/14; F16D 3/80
[52] U.S. Cl. ............................... 192/106.1; 192/70.17; 464/24
[58] Field of Search ............... 192/30 V, 70.17, 106.1, 192/106.2; 464/24, 62, 65, 82; 188/378

[56] References Cited

U.S. PATENT DOCUMENTS

| 2,337,134 | 12/1943 | Thelander | 192/106.2 |
| 2,513,379 | 7/1950 | Thelander | 192/106.2 |
| 4,351,167 | 9/1982 | Hanke et al. | 464/24 |

FOREIGN PATENT DOCUMENTS

| 626562 | 2/1936 | Fed. Rep. of Germany | 464/82 |
| 294015 | 7/1928 | United Kingdom . | |
| 516574 | 1/1940 | United Kingdom . | |
| 561897 | 6/1944 | United Kingdom . | |
| 650746 | 2/1951 | United Kingdom . | |

Primary Examiner—Rodney H. Bonck
Assistant Examiner—James J. Merek
Attorney, Agent, or Firm—Toren, McGeady and Stanger

[57] ABSTRACT

The torsional vibration damper which is suited in particular for the clutch disk of a motor vehicle friction clutch has two damper parts (13, 17) rotatable relative to one another around a common rotational axis (7) over a defined rotational angle, which damper parts (13, 17) together enclose at least one, preferably, at least three, damper chambers (33, 35) sealed outwardly and at least partially filled with a hydraulic fluid. A roller body (37) is arranged in each damper chamber (33, 35) which roller body (37) divides the damper chamber (33, 35) in the circumferential direction into two spaces (39, 41) whose relation of volume changes during the relative rotation of the damper parts (13, 17). A throttle connection (47) between the two spaces (39, 41) makes possible the compensation of the hydraulic fluid as a by-pass connection to the roller body (37). The damper chamber is formed by means of two recesses (33, 35) located opposite one another and with volumes varying from one another in faces (29, 31) of the damper parts (13, 17), which faces complement one another, adjoin one another on opposite sides and move relative to one another during relative rotation. The circumference of the roller body (37) is in a friction-locking or form-locking drive rotational contact with mutually oppositely located faces (43, 45) of the two recesses (33, 35) and rolls without slipping in the recesses. The roller body is formed particularly resilient and is fixed in the recesses (33, 35) under its own spring pretensioning. The roller faces (43, 45) of the recesses (33, 35) are so formed that an increasing pretensioning force and thus a restoring moment acting contrary to the torsional torque results as the torsional angle increases. Such a torsional vibration damper acts hydraulically as well as a spring damper and permits relatively large torsional angles.

13 Claims, 5 Drawing Figures

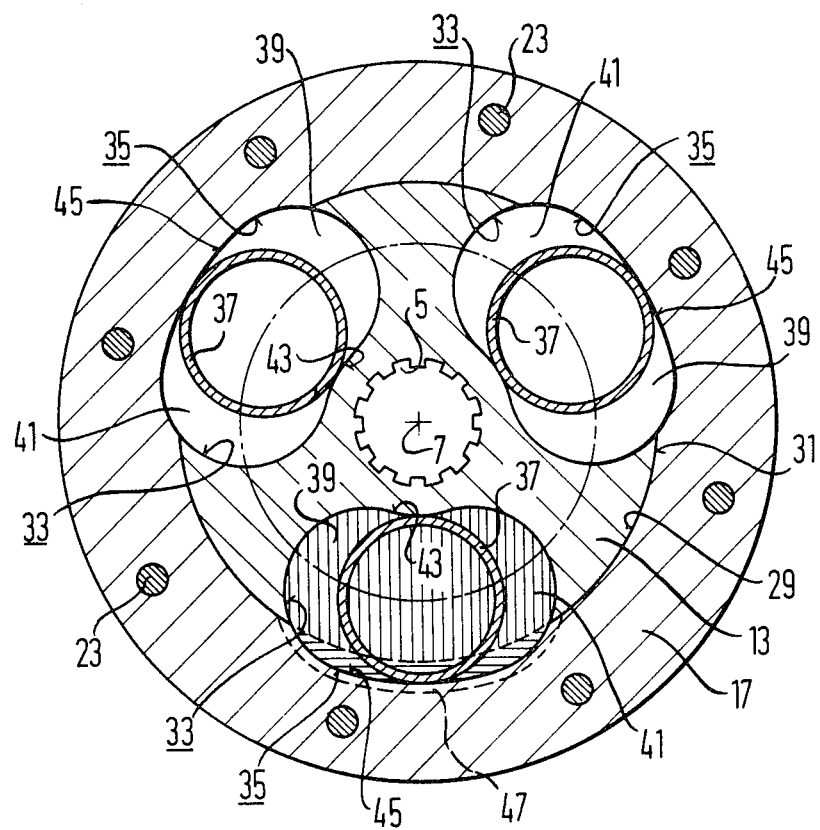

TORSIONAL VIBRATION DAMPER, PARTICULARLY FOR THE CLUTCH DISK OF A MOTOR VEHICLE FRICTION DISK CLUTCH

The invention relates to a torsional vibration damper with two damper parts rotatable relative to one another around a common rotational axis along a defined rotational angle, which damper parts together enclose at least one outwardly sealed damper chamber filled at least partially with a hydraulic fluid; with a displacement body in each damper chamber dividing the damper chamber in the circumferential direction into two spaces where the relation of volume of the two spaces changes during relative rotation of the damper parts; and with a throttle connection between the two spaces as a bypass connection to the displacement body.

A clutch disk for a motor vehicle friction clutch with this type of torsional vibration damper is known from U.S. Pat. No. 2,337,134. The clutch disk comprises, as is usual, a hub part and a substantially disk-shaped friction facing carrier which is rotatable but is axially fixed on the hub part. The hub part carries a ring flange which engages in a housing for the hydraulic fluid formed by the friction facing carrier and sealed relative to the hub part. The ring flange has several windows in which screw compression springs are arranged supported on the one side on stops of the friction facing carrier and, on the other side, on window edges lying opposite. The springs dampen rotational vibrations between the friction facing carrier and the hub part.

The housing of the friction facing carrier enclosing the springs is filled with hydraulic fluid and divided by means of intermediate walls into several spaces whose relations of volume change during relative rotation. As a bypass connection to the separating walls, the throttle connections provide that the hydraulic fluid can compensate between the spaces during change of volume. The constructional expense of such a hydraulic torsional vibration damper is relatively large and allows only limited damper action and a relatively limited torsional angle to be achieved.

It is the object of the invention to provide a structurally simple torsional vibration damper which permits a relatively large turning angle and has good damper characteristics.

This object is met according to the invention in that the damper chamber is formed by means of two recesses lying opposite one another with volumes varying from one another in mutually complementary faces of the damper parts, which faces are adjacent and lie opposite one another and move relative to one another during relative rotation; and in that the displacement body is formed as a roller body whose circumference is in a friction-locking or form-locking drive rotational contact with faces of the two recesses, which faces lie opposite one another.

When the two damper parts twist relative to one another the roller body which is fixedly connected with neither of the two damper parts rolls on the mutually opposite faces of the recesses without slipping. Each of the two spaces of the damper chamber divided by the roller body is defined by one of the two complementary faces, by the recess in the mutually opposite, complementary faces and by the roller body.

The twisting angle of the two damper parts is relatively large. Proceeding from a middle position in both rotational directions twisting angles of 30° and more can be achieved without difficulty. The friction losses are small since the roller body rolls in the recesses. The throttle connection can be effected via channels, grooves or the like in the walls of the recesses or of the complementary faces. Grooves or channels can also be provided in the roller body. Moreover, the roller body can end on at least one axial side at a distance from the recesses.

The mutually complementary faces can lie next to one another in the direction of the rotational axis. However, in preferred embodiment forms the damper parts are arranged coaxially one inside the other wherein the recesses forming the damper chamber are provided in mutually radially adjacent, preferably cylindrical circumferential jacket faces coaxial to the common rotational axis. Particularly, if at least three damper chambers arranged with the same angular distance around the rotational axis are provided, the outer damper part can be supported on the inner damper part in the manner of a ball bearing, which substantially simplifies the support of the damper parts on one another. It is advisable that the radially outward recess have a smaller volume than the radially inward recess. In this way the entire diameter of the torsional vibration damper can be kept small.

The damper chamber is preferably filled only partially with hydraulic fluid. During operation the hydraulic fluid can thus expand during an increase of operating temperature. The gas in the remaining space of the damper chamber is preferably under the influence of excess pressure. By means of the present constructions an initially small damper force is achieved with small torsional angles; and with increasing torsional angles under constant compression of the gas cushion the damper force constantly increases. Finally, the cavitation within the hydraulic medium is prevented.

The roller bodies can be toothed on their outer circumference and can mesh with corresponding toothings in the recesses in order to achieve a non-slipping rolling of the roller bodies. In a preferred embodiment form the roller body is resilient at least in its radial direction and is clamped in a friction-locking manner between mutually opposite faces of the two recesses in any relative position of the damper parts. The pretensioning force produced by means of the roller body itself must be large enough so that the roller bodies are prevented from slipping in the recesses. In addition, the roller bodies have a preferably cylindrical form or are formed as spring rings which can be filled with elastic material different from the spring ring material in order to increase the attainable spring forces. The material used for filling can be rubber-elastic material, e.g., plastic. However, the roller body can also have a full cross-section and can be made up as a whole of elastic material.

In a preferred embodiment form the resilient roller bodies are used in addition to form a torsional spring damper. For this purpose it is provided that the distance of the two faces of the two recesses, between which faces the roller bodies are held so as to be elastically pretensioned, diminishes in both rotational directions proceeding from a middle position of the two damper parts. This distance diminishes in such a way that the pretensioning force exerted on the roller body during relative rotation of the two damper parts increases, preferably symmetrically, proceeding from the middle position. If the two damper parts are twisted relative to one another the clamping force acting upon the resilient roller body increases as the rotational angle increases and damps torsional vibrations. However, it must be ensured here as well that the roller body rolls without slipping. By means of a suitable formation of the recesses a progressive spring characteristic can be achieved. The spring characteristic allows for a further influence in dependence on the rotational angle in that roller bodies with non-circular cross-sectional forms, for example, oval cross-sectional forms, are used so that the spring characteristics of the roller body, dependent on its angular position, change relative to the recesses. Non-uniform spring characteristics of the roller bodies can also be achieved in that, for example, radial screw springs or the like are clamped into the spring rings forming the roller bodies.

Figure 2A:
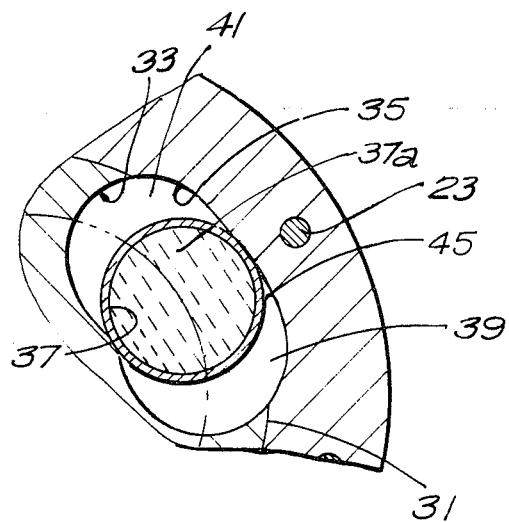
Figure 2B:
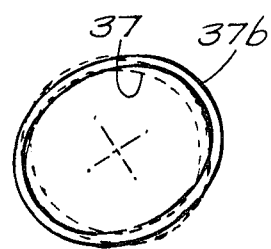
Figure 3:
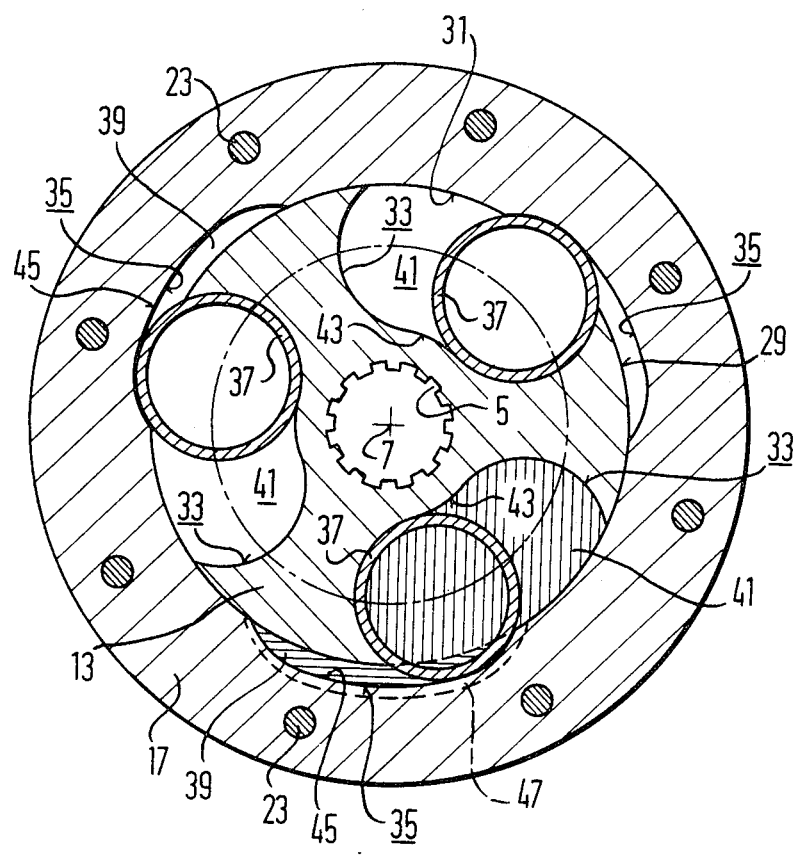

The invention is employed preferably in clutch disks of motor vehicle friction disk clutches. It will be explained in more detail in the following with the aid of an embodiment example. Shown are:

FIG. 1 an axial longitudinal section through a clutch disk of a motor vehicle friction clutch with a torsional vibration damper;

FIG. 2 an axial cross-section through the clutch disk according to FIG. 1 along a line II—II, shown in a middle position of the torsional vibration damper unloaded by means of torsional forces and FIG. 2A is a partial axial cross-section, similar to FIG. 2, illustrating another embodiment of the torsional vibration damper;

FIG. 2B is a view of an alternate roller body for use in the torsional vibration damper; and FIG. 3 a representation corresponding to FIG. 2 during loading of the torsional vibration damper by means of a torsional torque.

A clutch disk for a motor vehicle friction clutch comprises a hub part 1 with a centric hub 3 whose hub opening is provided with an inner toothing 5 for the non-rotatable connection with a gear unit input shaft, not shown. A friction facing carrier 9 is supported on the hub part 1 coaxial to the rotational axis 7 of the hub part so as to be rotatable but axially fixed. The friction facing carrier 9 comprises a housing 11 enclosing on both axial sides a disk-shaped flange 13 projecting radially from the hub 3 and this housing 11 is sealed towards the hub 3 by means of sealing rings 15. The housing 11 is composed of a ring 17 coaxially enclosing the flange 13 and of two ring disks 19, 21 arranged axially on both sides of the ring 17 which rest tightly on ring 17 and reach past the flange 13 to the hub 3. Rivets 23 fasten the ring disks 19, 21 on the ring 17 and, moreover, support an annular friction facing carrier disk 27 on the housing 11, which annular friction facing carrier disk 27 is provided axially on both sides with friction facings 25.

The outer circumferential face of the flange 13 designated by 29 has a circular cylindrical basic shape just like the inner circumferential face of the ring 17 designated by 31. The circumferential faces 29, 31 closely adjoin one another. Three radially inwardly directed recesses 33 with the same angular distance from one another are arranged around the rotational axis in the circumferential face 29 of the flange 13. Three additional recesses 35 are provided in the inner circumferential face 31 of the ring 17 which are located radially opposite the recesses 33 in a position of the ring 17 relative to the flange 13 designated hereafter as middle position. Each of the reciprocally assigned recesses 33 and 35 together with the axially covering ring disks 19, 21 form a damper chamber at least partially filled with a hydraulic fluid (not shown) as indicated in FIGS. 2 and 3 by hatchings. Each of these damper chambers is divided into two spaces 39 and 41 lying adjacent one another in the circumferential direction of the flange 13 and the ring 17, respectively, by means of a hollow cylindrical spring ring 37 arranged with its axis parallel to the rotational axis 7. The spring rings 37 sit in recesses 33, 35 under the influence of radial, inherent spring pretensioning and roll on the radially inward base 43 of recess 33 and the radially outward base 45 of the recess 35 during relative rotation of the hub part 1 and the flange 13, respectively, on the one side and of the friction facing carrier 9 and the ring 17 on the other side. The spring pretensioning produced by means of the deformation of the spring rings 37 is large enough dimensioned that the spring rings 37 do not slip on the bases 43, 45. The bases 43, 45 have a substantially cylindrical shape in the rolling area of the spring rings 37, wherein the variations for the production of a progressive increase of the spring pretensioning is to be explained in the following.

The volume of recess 33 enclosed between the base 43, the two ring disks 19, 21 and the intended cylinder jacket extension of the circumferential face 29 is larger than the volume of the recess 35 enclosed by base 45, ring disks 19, 21 and the intended extension of the cylinder jacket of the circumferential face 31. In the middle position shown in FIG. 2 the spring rings 37 divide the damper chambers formed in the middle position by the mutually radially aligned recesses 33, 35 into two equally large spaces 39 and 41. The two spaces 39, 41 are connected with one another by means of axial gaps 46 between the axial edges of the spring rings 37 and the ring disks 19 and 21 as a bypass connection to the spring rings 37. If the flange 13 and the ring 17 are twisted relative to one another then the volumes of the spaces 39 and 41 divided by the spring rings 37 change as shown by the hatching of recesses 33 and 35 in FIG. 3. The hydraulic liquid in the damper chamber can compensate via the throttle connections on both sides of the spring rings 37. The torsional movement is accordingly hydraulically damped.

The throttle connection can be formed in addition to or in place of the gaps 46 on both axial sides of the spring rings 37 by means of a throttle channel on the base of the recess 33 or 35 as is indicated in the figures by means of a dashed line 47.

The radial distance of the bases 43 and 45 of the two recesses 33 and 35, which bases 43 and 45 are symmetrical in the circumferential direction towards the middle position, decreases away from the middle position. If the recesses 33 and 35 are offset relative to one another during torsion of the flange 13 relative to the ring 17 then the radial deformation of the spring rings 37, and thus their spring pretensioning, increases as the rotational angle increases. The increasing pretensioning of the spring rings 37 effects a restoring moment because of the bases 43, 45 converging in the circumferential direction, which restoring moment would like to turn back the flange 13 and the ring 17 or the parts connected with it, respectively, to the middle position. The spring rings 37 thus effect a torsional spring damping. The end faces of the recesses 33, 35 arranged in the circumferential direction are adapted to the form of the spring rings 37 and form stop faces which define the rotational angle of the flange 13 relative to the ring 17. To increase the spring force of the spring rings 37 these latter can be filled with an elastic material 37a, note FIG. 2A. The spring rings can also optionally be deformed in the non-installed state so that they produce various spring pretensionings in dependence on their angular position relative to to the flange 13 and the ring 17, respectively. As an example, note FIG. 2B where a non-circular or oval shaped roller body or spring ring 37b is illustrated in full lines, in the non-installed state and in dashed lines in the deformed installed state.

The damper chambers are only partially filled with hydraulic fluid, wherein the remaining space of each damper chamber contains gas under excess pressure. The gas is first compressed proceeding from the middle position before hydraulic fluid is compensated via the throttle connection. In this way cavitation of the hydraulic fluid and a constant progression of hydraulic damping is achieved.

The housing 11 in FIG. 1 composed of the ring 17 and the ring disks 19, 21 can also be construed in another manner. In particular, the ring 17 and the ring disk 19 can be formed as one piece, for example, as a pressure-die cast part, while the friction facing carrier disk 27 at the same time forms the ring disk 21. The sealing rings 15 are, in any case, arranged preferably radially within the circumferential face 29 of the flange 13 so that the sealing rings 15 are relieved from the hydraulic fluid pressure because of the centrifugal force.

At least one of the two ring disks 19 and 21 is dimensioned with respect to its elastic bending characteristics in the area of the damper chambers in such a way that the damper chamber in damping operation can expand axially during an increase of the pressure in the hydraulic fluid. If the hydraulic pressure increases in the space of the damper chamber to which pressure is applied, then the gap 46 between the spring ring 37 and the adjacent ring disks 19 and 21 expands. This leads to a reduction of the throttle action and, accordingly, to a restriction of the damping force. The elastic bending characteristics of the ring disks 19, 21 are dimensioned so that the hydraulic pressure constantly remains under a pressure limit in excess of which the spring rings would slip or slide. The elastic bending characteristics can be adjusted by means of suitable selection of material or suitable dimensioning of the wall thickness of the ring disks. The distribution of the bending characteristics can be pre-given, for example, by means of ribs provided on the outside of the ring disks 19, 21.

We claim:

1. Torsional vibration damper with two damper parts (1, 9) rotatable relative to one another around a common rotational axis (7) over a defined rotational angle which together enclose at least one damper chamber (33,35) sealed outwardly and at least partially filled with a hydraulic fluid; with a displacement body (37) in each said damper chamber (33, 35) which divides said damper chamber (33, 35) in the circumferential direction into two spaces (39, 41) whose volume relation changes during the relative rotation of said damper parts (1, 9); and with a throttle connection (46, 47) between the two said spaces (39, 41) as a bypass connection to said displacement body (37), characterized in that said damper chamber is formed by means of two recesses (33, 35) located opposite one another, having volumes which are different from one another in faces (29, 31) of said damper parts (1, 9) which faces complement one another, lie opposite one another adjacently and move relative to one another during relative rotation; and in that said displacement body is formed as a roller body (37) whose circumference is in a friction-locking or form-locking drive rotational contact with faces (43, 45) of said recesses (33, 35), which faces are located opposite one another.

2. Torsional vibration damper according to claim 1, characterized in that said damper parts (1, 9) are arranged coaxially one inside the other and in that said recesses (33, 35) forming said damper chamber are provided in circumferential jacket faces (29, 31) which are coaxial to the common rotational axis (7) and adjoin each other radially.

3. Torsional vibration damper according to claim 2, characterized in that said recesses (33, 35) are provided in mutually adjacent cylinder faces (29, 31) of both said damper parts (1, 9).

4. Torsional vibration damper according to claim 2, characterized in that said radially outward recess (35) has a smaller volume than said radially inward recess (33).

5. Torsional vibration damper according to claim 1, characterized in that said damper chamber (33, 35) is only partly filled with hydraulic fluid and is otherwise filled with a gas under excess pressure.

6. Torsional vibration damper according to claim 1, characterized in that said roller body (37) is resilient at least in its radial direction and is fixed in a friction-locking engagement in any relative position of said damper parts (1,9) between said faces (43,45) of the two said recesses (33, 35) which faces are located opposite one another.

7. Torsional vibration damper according to claim 6, characterized in that said roller body (37) has a cylindrical shape.

8. Torsional vibration damper according to claim 6, characterized in that said roller body is formed as a spring ring (37).

9. Torsional vibration damper according to claim 8, characterized in that the interior of said spring ring (37) is filled with an elastic material different from the spring ring material.

10. Torsional vibration damper according to one of claims 6 through 9, characterized in that the distance of the two said faces (43, 45) of the two said recesses (33,35), between which faces (43,45) said roller bodies (37) are held so as to be resiliently pretensioned, decreases from a middle position of the two said damper parts (1, 9) to the two rotational directions in such a way that during the relative rotation of the two said damper parts (1, 9) the pretensioning force exerted on said roller body (37) increases preferably symmetrically in both relative rotational directions proceeding from a middle position.

11. Torsional vibration damper according to claim 10, characterized in that said roller body (37) has an oval cross-sectional form in the non-pretensioned state.

12. Torsional vibration damper according to claim 1, wherein one said damper part is formed as a hub part (1) of a clutch disk for a motor vehicle friction disk clutch and the other said damper part is formed as a friction facing carrier (9) supported on said hub part (1) so as to be rotatable but axially fixed, characterized in that at least three said roller bodies (37) arranged with the same angular distance from one another around said rotational axis (7) are provided, by means of which roller bodies (37) said friction facing carrier (9) is rotatably supported on said hub part (1).

13. Torsional vibration damper according to claim 2 or 3, characterized in that said damper chamber is defined in the axial direction of said damper parts (1, 9) by walls (19, 21) of which at least one is dimensioned with respect to its elastic bending characteristics so that with increasing pressure of the hydraulic fluid in damping operations the axial distance of said elastic wall (19, 21) from said roller body (37) increases under the influence of the formation or expansion of a connecting gap (46) and maintains the pressure in said hydraulic fluid below a value which would cause said roller body (37) to slip.

* * * * *